United States Patent [19]

Brauer

[11] Patent Number: 5,051,693
[45] Date of Patent: Sep. 24, 1991

[54] BEARING SEAT ENCODER MOUNT FOR ROTATIONAL PARAMETER SENSOR APPARATUS

[75] Inventor: Michael C. Brauer, Burlington, Conn.

[73] Assignee: The Torrington Company, Torrington, Conn.

[21] Appl. No.: 578,404

[22] Filed: Sep. 7, 1990

[51] Int. Cl.$^5$ .......................... G01P 3/42; G01B 7/30; F16C 32/00
[52] U.S. Cl. .................. 324/207.22; 324/174; 324/207.14; 384/448
[58] Field of Search .................. 324/173, 174, 207.14, 324/207.20, 207.21, 207.22, 207.25; 310/155, 168; 384/446, 448; 73/518, 519; 188/181 R

[56] References Cited

U.S. PATENT DOCUMENTS

| | | | |
|---|---|---|---|
| 4,259,637 | 3/1981 | Bloomfield et al. | 324/173 X |
| 4,415,054 | 11/1983 | Drutchas | 180/79.1 |
| 4,550,597 | 11/1985 | Drutchas et al. | 73/118 |
| 4,681,182 | 7/1987 | Suzuki et al. | 180/79.1 |
| 4,703,262 | 10/1987 | Fujioka et al. | 324/207.22 |
| 4,732,494 | 3/1988 | Guers et al. | 384/446 X |
| 4,795,278 | 1/1989 | Hayashi | 324/174 X |
| 4,797,612 | 1/1989 | Nakanishi et al. | 73/518 X |
| 4,864,231 | 9/1989 | Okumura et al. | 324/173 |
| 4,890,059 | 12/1989 | Guentner | 324/174 |
| 4,901,562 | 2/1990 | Beakas et al. | 73/118.1 |
| 4,904,936 | 2/1990 | Richmond | 324/174 |
| 4,940,936 | 7/1990 | Grillo et al. | 73/518 X |

*Primary Examiner*—Gerard R. Strecker
*Attorney, Agent, or Firm*—Michael H. Minns; Glenn B. Foster

[57] ABSTRACT

An apparatus for sensing rotational parameters of a shaft relative to a member, the apparatus has a bearing having an inner race with an inner diameter, the inner diameter being greater than the diameter of the shaft. An annular space is formed between the inner diameter and the shaft. A bearing seat is disposed within the space, and is fixed to the shaft. An annular encoder is affixed to the bearing seat. A sensor is located in close proximity to the annular encoder, and is fixed to the member. The bearing seat may be of either the cantilevered or split ring designs. The annular encoder is sensed by the sensor in either an axial or a radial direction.

25 Claims, 2 Drawing Sheets

5,051,693

BEARING SEAT ENCODER MOUNT FOR ROTATIONAL PARAMETER SENSOR APPARATUS

This invention related generally to sensor bearings, and more particularly to a sensor bearing wherein the encoder is rotationally affixed to the bearing seat.

Electronic control units (ECU) amass information from sensors and command the action of many vital functions in automobiles. The major areas in which ECUs have made substantial inroads are the engine, the transmission, the suspension and the anti-lock brakes.

In all of these cases, the data describing the rotational motion or positional change are fed to the ECU, which prepares a calculated or mapped response ideal for the operational conditions. The ECU then initiates changes in the controlled function to minimize deviation from the ideal condition. High reliability, good resolution and economic costs are desired in sensor bearing technology.

Encoder retention and location are very important in the design of sensing systems for rotational position, velocity and acceleration measurements.

Previously, the encoder has been located in many positions relative to a rotating shaft whose velocity the sensor will measure. In one design, the encoder is affixed to the rotating bearing raceway. Other designs have connected the encoder to the rotating shaft either directly of through an separate intermediate member.

While the above locations are suitable for certain applications, there are situations where design and space criterion restrict use of the encoder in these locations. In these instances, it is desirable to mount the encoder in different locations.

The forgoing illustrates limitations known to exist in present sensor bearings. Thus it is apparent that it would be advantageous to provide an alternative directed to overcoming one or more of the limitations set forth above. Accordingly, a suitable alternative is provided including features more fully disclosed hereinafter.

SUMMARY OF THE INVENTION

In one aspect of the present invention, this is accomplished by an apparatus for sensing rotational parameters of a shaft relative to a member, the apparatus comprising a bearing having an inner race with an inner diameter, the inner diameter being greater than the diameter of the shaft. An annular space being formed between the inner diameter and the shaft. A bearing seat is disposed within the space, being fixed to the shaft. An annular encoder is affixed to the bearing seat. A sensor is located in close proximity to the annular encoder, being fixed relative to the member.

The foregoing and other aspects will become apparent from the following detailed description of the invention when considered in conjunction with the accompanying drawing figures.

BRIEF DESCRIPTION OF THE DRAWING FIGURES

DETAILED DESCRIPTION

Figure 1:
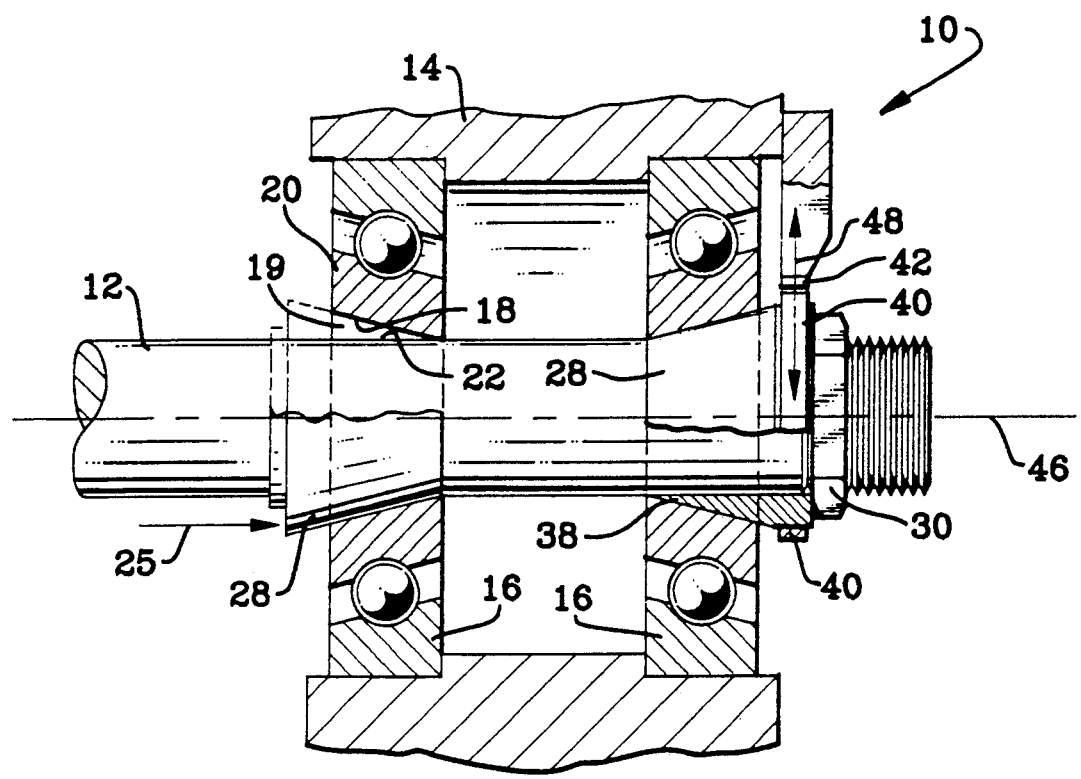
FIG. 1 is a side cross sectional view illustrating one embodiment of bearing seat and encoder combination to sense relative rotation between a rotary shaft relative to a housing.

In this disclosure, identical elements in different embodiments may be referenced by identical reference characters.

An apparatus which senses rotational parameters (such as rotational position, velocity and acceleration) is shown generally at 10. The apparatus includes a shaft 12 which rotates relative to fixed point 14. The fixed point 14 may be a part of a vehicle, part of a machine or part of the ground. The instant invention has been found especially applicable to vehicle portions, where space limitations result in locations where a sensor may be located being at a premium.

The shaft 12 is supported by bearing means 16. In many applications where assembly involves placement of the bearing means 16 on the shaft, there is a need for a clearance or space 19 between an inner diameter 18 of an inner race 20 and an outer diameter 22 of the shaft.

To take up some of this clearance 19, a bearing seat 28 is forced (as illustrated by arrow 25) into the space 19. This configuration is especially desirable where the bearing means 16 are angular contact bearings (illustrated in FIG. 1) where this force can be used to preload the bearings. The angular contact bearing may be an angular contact roller, an angular contact ball or any other well known type of bearing which can withstand both a thrust and a radial force.

Figure 2:
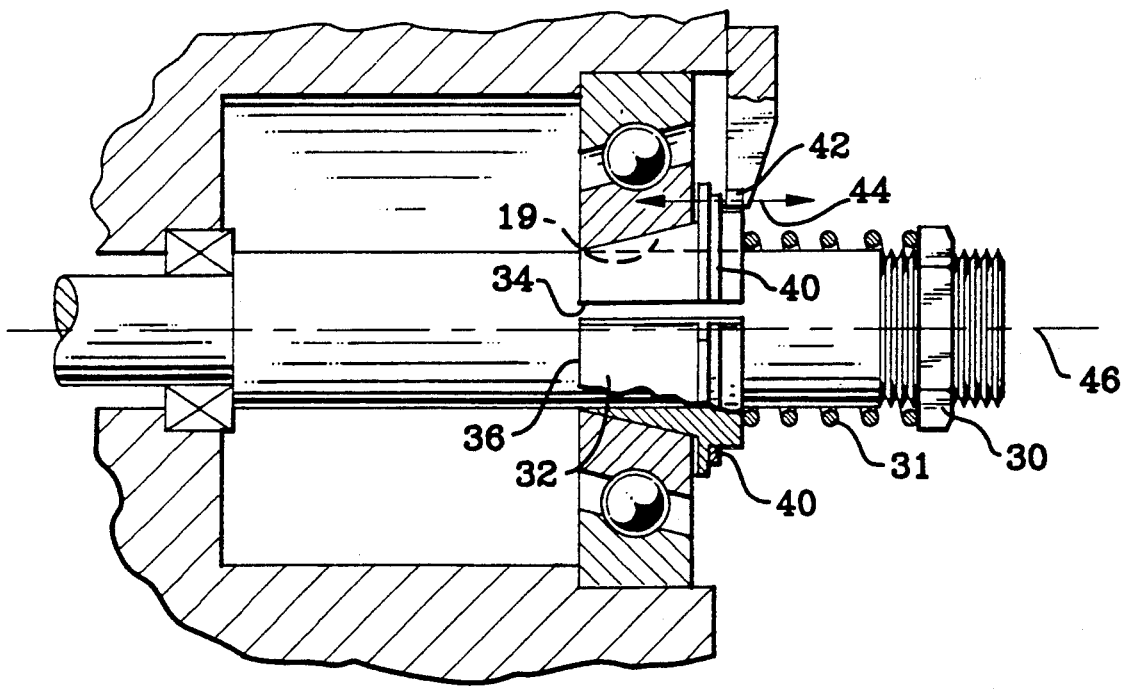
FIG. 2 is a view similar to FIG. 1, illustrating an alternate embodiment of sensor.

To preload an angular contact bearing, a bearing seat 28 may be applied to one or more of the bearings (as illustrated in FIG. 2 and 1 respectively). The bearing seat will rotate uniformly with the inner race 20 and the shaft 12 as one member. Therefore, the rotation of the bearing seat 28 will provide an accurate indication of the rotation of the shaft 12.

The above preload may be applied by a securement device 30 such as a nut which is applied to the shaft 12 (FIG. 1). Preferably a spring device 31 will be used in conjunction with the securement device 30 (FIG. 2) whereby the bearings may undergo minor axial deviations relative to the shaft 12 without alteration of the preload force.

There are at least two configurations of bearing seat 28 which may be used in the instant application. The first configuration, known as the split seat bearing seat 32, is illustrated in FIG. 2. The split ring bearing seat design has a slot 34 which permits radial expansion and contraction of the seat. In this manner, a first axial end 36 of the seat 32 may be compressed to conform to the clearance 19.

The other configuration of bearing seat, known as the cantilevered bearing seat 28, (illustrated in FIG. 1), has a first end 38 which is flexible to permit deformation to conform with the clearance 19 when the bearing seat 28 is forced into contact with the bearing means 16.

An encoder 40 is attached to, and will rotate as a unitary member with, the bearing seat 28. In this manner, the bearing seat rotation will provide an accurate indication of rotation of the shaft 12. The encoder may be formed as a unitary member with the bearing seat, or may be attached to the bearing seat using adhesives or known fastening devices compatible with the mechanical properties of the encoder.

A sensor 42 is located in close proximity to the encoder. Any well known type of sensor may be used in this application, but Hall Effect sensors and magneto resistive sensors have been found especially applicable.

The location at which the sensor 42 is located depends largely upon the configuration of the encoder 40. FIG. 2 illustrates an axial sensor configuration in which the direction 44 in which the sensor 42 senses the rotational parameters of the shaft is substantially parallel to a rotary axis 46 of the shaft 12.

By comparison, FIG. 1 illustrates a radial sensor configuration in which the direction 48 in which the sensor 42 senses the rotational parameters of the shaft is substantially perpendicular to the rotary axis 46 of the shaft 12.

Figure 3:
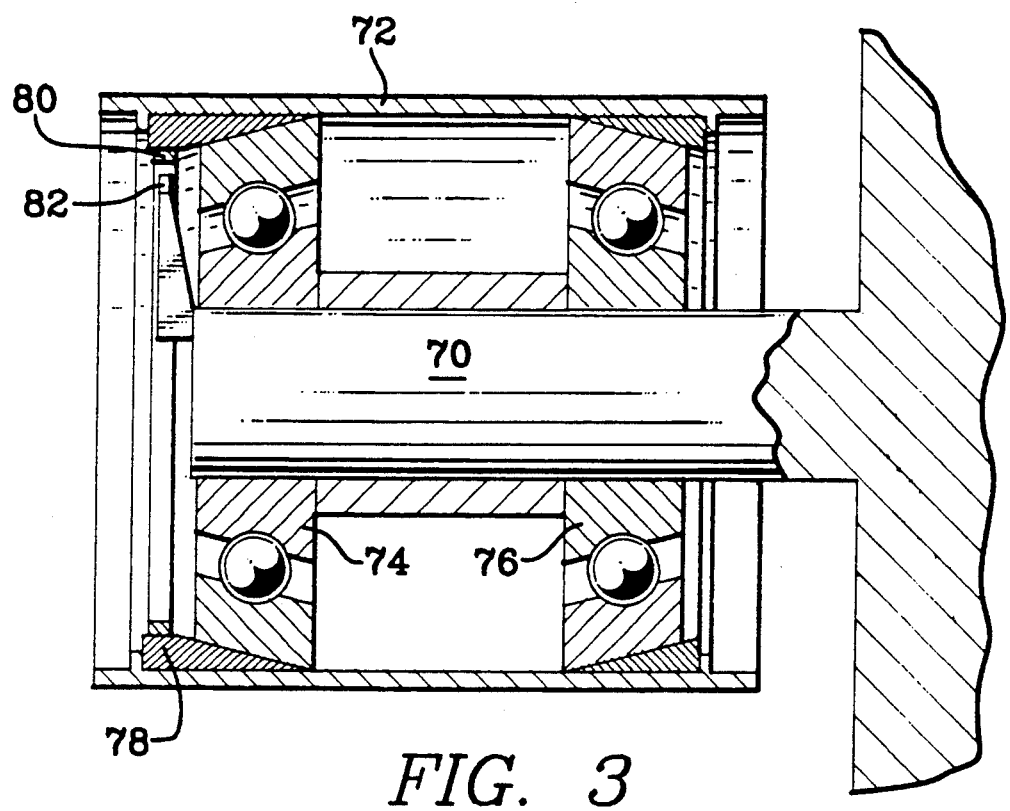
FIG. 3 is a similar view illustrating an embodiment of bearing seat and encoder combination to sense relative rotation between a rotary housing and a shaft.

FIG. 3 illustrates a stationary body 70 which a rotating member 72 rotates about. The rotating member 72 is supported by a plurality of bearings 74, 76. A bearing seat 78 properly secures one of the bearings 74, 76. The bearing seat has an annular encoder 80 attached to it, as previously described, and rotates therewith. The encoder thereby gives an accurate indication of the rotation of the rotating member 72. A sensor 82, which is attached to the stationary body 70, measures rotational parameters of the rotating member 72 relative to the body 70.

What is claimed is:

1. An apparatus for sensing rotational parameters of a shaft relative to a member comprising:
   a bearing having an inner race with an inner diameter greater than the diameter of the shaft, an annular space being formed between the inner diameter and the shaft;
   a bearing seat disposed within the annular space, the bearing seat being fixed to the shaft;
   an annular encoder fixed to the bearing seat; and
   a sensor located in close proximity to the annular encoder, the sensor being fixed to the member.

2. The apparatus as described in claim 1, wherein the sensor is a hall effect sensor.

3. The apparatus as described in claim 1, wherein the sensor is a magneto resistive sensor.

4. The apparatus as described in claim 1, further comprising:
   a securement means for restricting displacement of the bearing seat away from the bearing means.

5. The apparatus as described in claim 4, further comprising:
   a biasing means inserted between the bearing seat and the securement means to bias the bearing seat into contact with the bearing.

6. The apparatus as described in claim 1, wherein the annular encoder and the bearing seat are a unitary member.

7. The apparatus as described in claim 1 wherein the bearing seat applies a preload to the bearing.

8. The apparatus as described in claim 7, wherein the bearing seat is cantilevered.

9. The apparatus as described in claim 7, wherein the bearing seat is formed from a split ring.

10. The apparatus as described in claim 1, wherein the direction in which the sensor senses the encoder is parallel to the axis of rotation of the shaft.

11. The apparatus as described in claim 1, wherein the direction in which the sensor senses the encoder is perpendicular to the axis of rotation of the shaft.

12. An apparatus for sensing rotational parameters of a shaft relative to a member comprising:
    a bearing having an inner race with an inner diameter greater than the diameter of the shaft providing an annular space between the inner diameter and the shaft;
    bearing seat means disposed within the space for applying a preload to the bearing, the bearing seat means being fixed to the shaft;
    an annular encoder fixed to the bearing seat means; and
    a sensor located in close proximity to the annular encoder, the sensor being fixed to the member.

13. The apparatus as described in claim 12, wherein the sensor is a hall effect sensor.

14. The apparatus as described in claim 12, wherein the sensor is a magneto resistive sensor.

15. The apparatus as described in claim 12, further comprising a securement means for restricting displacement of the bearing seat means away from the bearing.

16. The apparatus as described in claim 15, further comprising:
    a biasing means inserted between the bearing seat means and the securement means to bias the bearing seat means into contact with the bearing.

17. The apparatus as described in claim 12, wherein the annular encoder and the bearing seat means are a unitary member.

18. The apparatus as described in claim 12, wherein the bearing seat means applies a preload to the bearing.

19. The apparatus as described in claim 18, wherein the bearing seat means is cantilevered.

20. The apparatus as described in claim 18, wherein the bearing seat means is formed from a split ring.

21. The apparatus as described in claim 18, wherein the direction in which the sensor senses the encoder is parallel to the axis of rotation of the shaft.

22. The apparatus as described in claim 18, wherein the direction in which the sensor senses the encoder is perpendicular to the axis of rotation of the shaft.

23. An apparatus for sensing rotational parameters of a shaft relative to a vehicular housing comprising:
    a bearing having an inner race with an inner diameter greater than the diameter of the shaft, an annular space being formed between the inner diameter and the shaft;
    a bearing seat disposed within the space, the bearing seat being fixed to the shaft;
    an annular encoder fixed to the bearing seat; and
    a sensor, fixed to the vehicular housing, located in close proximity to the annular encoder.

24. An apparatus for sensing rotational parameters of a shaft relative to a member comprising:
    a bearing having an inner race with an inner diameter greater than the diameter of the shaft providing an annular space between the inner diameter and the shaft;
    bearing seat means disposed within the space for centrally positioning the shaft relative to the bearing, the bearing seat means being fixed to the shaft;
    an annular encoder fixed to the bearing seat means; and
    a sensor located in close proximity to the annular encoder, the sensor being fixed to the member.

25. An apparatus for sensing rotational parameters of a housing relative to a stationary body, the housing having an inner dimension, the apparatus comprising:
    a bearing having an outer race with an outer diameter, the outer diameter being less than the inner dimension of the housing, an annular space being formed between the inner diameter and the housing;
    a bearing seat disposed within the annular space, the bearing seat being fixed to the housing;
    an annular encoder fixed to the bearing seat; and
    a sensor which is fixedly attached to the body, located in close proximity to the annular encoder.

* * * * *